(12) United States Patent
Chang et al.

(10) Patent No.: US 11,449,735 B2
(45) Date of Patent: Sep. 20, 2022

(54) SPIKING NEURAL NETWORK FOR PROBABILISTIC COMPUTATION

(71) Applicant: HRL Laboratories, LLC, Malibu, CA (US)

(72) Inventors: Hao-Yuan Chang, Los Angeles, CA (US); Aruna Jammalamadaka, Agoura Hills, CA (US); Nigel D. Stepp, Santa Monica, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 542 days.

(21) Appl. No.: 16/577,908

(22) Filed: Sep. 20, 2019

(65) Prior Publication Data

US 2020/0026981 A1 Jan. 23, 2020

Related U.S. Application Data

(63) Continuation-in-part of application No. 16/294,815, filed on Mar. 6, 2019, now Pat. No. 10,748,063.

(60) Provisional application No. 62/790,296, filed on Jan. 9, 2019, provisional application No. 62/659,085, filed on Apr. 17, 2018.

(51) Int. Cl.
  *G06N 3/04* (2006.01)
  *G06N 3/08* (2006.01)
  *G06N 3/063* (2006.01)

(52) U.S. Cl.
  CPC ............. *G06N 3/049* (2013.01); *G06N 3/063* (2013.01); *G06N 3/08* (2013.01)

(58) Field of Classification Search
  None
  See application file for complete search history.

(56) References Cited

U.S. PATENT DOCUMENTS

| 9,218,563 | B2 | 12/2015 | Szatmary et al. | |
| 2015/0074026 | A1 | 3/2015 | Szatmary et al. | |
| 2018/0075345 | A1* | 3/2018 | Gottfried | G06N 3/049 |
| 2020/0342321 | A1* | 10/2020 | Paul | G06N 3/0472 |

OTHER PUBLICATIONS

Sarajedini A, Hecht-Nielsen R, Chau PM. Conditional probability density function estimation with sigmoidal neural networks. IEEE Transactions on neural networks. Mar. 1999; 10(2):231-8. (Year: 1999).*

(Continued)

*Primary Examiner* — Vincent Gonzales
(74) *Attorney, Agent, or Firm* — Tope-McKay & Associates

(57) ABSTRACT

Described is a system for computing conditional probabilities of random variables for Bayesian inference. The system implements a spiking neural network of neurons to compute the conditional probability of two random variables X and Y. The spiking neural network includes an increment path for a synaptic weight that is proportional to a product of the synaptic weight and a probability of X, a decrement path for the synaptic weight that is proportional to a probability of X, Y, and delay and spike timing dependent plasticity (STDP) parameters such that the synaptic weight increases and decreases with the same magnitude for a single firing event.

12 Claims, 13 Drawing Sheets

(56) References Cited

OTHER PUBLICATIONS

Notification of Transmittal of International Search Report and the Written Opinion of the International Searching Authority for PCT/US2019/021049; dated Jun. 21, 2019.
International Search Report of the International Searching Authority for PCT/US2019/021049; dated Jun. 21, 2019.
Written Opinion of the International Searching Authority for PCT/US2019/021049; dated Jun. 21, 2019.
Qiuwen Chen et al. 'Real-time anomaly detection for streaming data using burst code on a neurosynaptic processor'. Design, Automation & Test in Europe Conference & Exhibition (DATE), 2017.
Subutai Ahmad et al. 'Real-Time Anomaly Detection for Streaming Analytics', arXiv:1607.02480v1, Jul. 8, 2016.
Andrew S. Cassidy et al. 'TrueNorth: a High-Performance, Low-Power Neurosynaptic Processor for Multi-Sensory Perception, Action, and Cognition', Technical Report, IBM ResearchAlmaden Research Center San Jose United States, 2016.
J. Bill, L. Buesing, S. Habenschuss, B. Nessler, W. Maass, and R. Legenstein. Distributed bayesian computation and self-organized learning in sheets of spiking neurons with local lateral inhibition. PloS one, 10(8):e0134356, 2015, pp. 1-51.
Song et al., "Competitive Hebbian Learning through Spike-Timing-Dependent Synaptic Plasticity" in Nature Neuroscience 3, pp. 919-926.
Notification of Transmittal, The International Search Report, and the Written Opinion of the International Searching Authority for PCT/US2019/052275; dated Dec. 19, 2019.
N. Stepp, A. Jammalamadeka: "A dynamical systems approach to neuromorphic computation of conditional probabilities", Proceedi Ngs of the Internationalconference on Neuromorphic Systems, ICONS '18, vol. 4, Jul. 23, 2018 (Jul. 23, 2018), pp. 1-4.
J. Bill et al: "Distributed Bayesian computation and self-organized learning in sheets of spiking neurons with local lateral inhibition" PLOS Computational Biology, vol. 10, No. 8, E0134356, Aug. 18, 2015 (Aug. 18, 2015), pp. 1-51.
D. Querlioz et al: "Bioinspired programming of memory devices for implementing an inference engine", Proceedings of the IEEE, vol. 103, No. 8, Jul. 13, 2015 (Jul. 13, 2015), pp. 1398-1416.
J. Bill, L. Buesing, S. Habenschuss, B. Nessler, W. Maass, and R. Legenstein. Distributed Bayesian Computation and Self-Organized Learning in Sheets of Spiking Neurons with Local Lateral Inhibition. PloS one, 10(8):e0134356, pp. 1-51, 2015.
N. Stepp, A. Jammalamadaka. A Dynamical Systems Approach to Neuromorphic Computation of Conditional Probabilities, pp. 1-4 Proceedings of the International Conference on Neuromorphic Systems ICONS'18, 2018.
Ş. Mihalaş, E. Niebur. A Generalized Linear Integrate-and-Fire Neural Model Produces Diverse Spiking Behaviors. Neural Computation, 21(3): pp. 704-718, 2009.
C.W.J. Granger. Investigating Causal Relations by Econometric Models and Cross-Spectral Methods. Econometrica 37, pp. 424-438, 1969.
Song, S., Miller K.D., and L.F. Abbott. Competitive Hebbian Learning through Spike-Timing Dependent Synaptic Plasticity. Nat Neurosci 3(9): pp. 919-926, 2000.
Notification of and the International Preliminary Report on Patentability Chapter II for PCT/US2019/052275; dated Oct. 8, 2020.

* cited by examiner

| $Y_{t+1}$ \ $X_t$ | 1 | 2 | 3 | 4 | 5 | 6 | 7 | 8 | 9 | 10 |
|---|---|---|---|---|---|---|---|---|---|---|
| 1 | 0.03 | 0.04 | 0.23 | 0.05 | 0.03 | 0.05 | 0.11 | 0.01 | 0.03 | 0.02 |
| 2 | 0.04 | 0.03 | 0.05 | 0.05 | 0.03 | 0.11 | 0.04 | 0.01 | 0.06 | 0.02 |
| 3 | 0.04 | 0.03 | 0.05 | 0.05 | 0.02 | 0.05 | 0.04 | 0.01 | 0.03 | 0.02 |
| 4 | 0.04 | 0.03 | 0.05 | 0.05 | 0.13 | 0.05 | 0.04 | 0.01 | 0.03 | 0.11 |
| 5 | 0.03 | 0.04 | 0.05 | 0.05 | 0.02 | 0.05 | 0.04 | 0.01 | 0.04 | 0.02 |
| 6 | 0.03 | 0.03 | 0.05 | 0.05 | 0.02 | 0.05 | 0.04 | 0.01 | 0.04 | 0.02 |
| 7 | 0.04 | 0.04 | 0.05 | 0.06 | 0.02 | 0.05 | 0.04 | 0.01 | 0.03 | 0.02 |
| 8 | 0.04 | 0.03 | 0.05 | 0.05 | 0.03 | 0.05 | 0.04 | 0.01 | 0.03 | 0.02 |
| 9 | 0.03 | 0.03 | 0.05 | 0.05 | 0.02 | 0.05 | 0.04 | 0.02 | 0.03 | 0.02 |
| 10 | 0.04 | 0.04 | 0.05 | 0.05 | 0.02 | 0.05 | 0.04 | 0.02 | 0.03 | 0.02 |

FIG. 9

SPIKING NEURAL NETWORK FOR PROBABILISTIC COMPUTATION

CROSS-REFERENCE TO RELATED APPLICATIONS

The present application is a Continuation-in-Part application of U.S. application Ser. No. 16/294,815, filed in the United States on Mar. 6, 2019, entitled, "A Neuronal Network Topology for Computing Conditional Probabilities," which is a Non-Provisional Application of U.S. Provisional Application No. 62/659,085, filed in the United States on Apr. 17, 2018, entitled, "A Neuronal Network Topology for Computing Conditional Probabilities," the entirety of which are incorporated herein by reference.

The present application is ALSO a Non-Provisional Application of U.S. Provisional Application No. 62/790,296, filed in the United States on Jan. 9, 2019, entitled, "A Spiking Neural Network for Probabilistic Computation," the entirety of which is incorporated herein by reference.

BACKGROUND OF INVENTION

(1) Field of Invention

The present invention relates to a system for computing conditional probabilities of random variables for structure learning and Bayesian inference and, more particularly, to a system for computing conditional probabilities of random variables for structure learning and Bayesian inference using a unique spiking neural network.

(2) Description of Related Art

In machine learning, Bayesian inference is a popular framework for making decisions by estimating the conditional dependencies between different variables in the data. The inference task is often computationally expensive and performed using conventional digital computers.

One prior method for probabilistic computation uses synaptic updating to perform Bayesian inference (see Literature Reference No. 1 of the List of Incorporated Literature References), but the method is only a mathematical theory and not biologically plausible.

Thus, a continuing need exists for an approach that is biologically plausible and, therefore, easy to implement in neuromorphic hardware.

SUMMARY OF INVENTION

The present invention relates to a system for computing conditional probabilities of random variables for structure learning and Bayesian inference, and more particularly, to a system for computing conditional probabilities of random variables for structure learning and Bayesian inference using a unique spiking neural network. The system comprises a neuromorphic hardware for implementing a spiking neural network comprising a plurality of neurons to compute the conditional probability of two random variables X and Y according to the following:

$$w^*P(X) = P(X,Y),$$

where P denotes probability, and w denotes a synaptic weight between a first neuron and a connected second neuron. An X neuron and a Y neuron are configured to spike along with the random variables X and Y. The spiking neural network comprises an increment path for w that is proportional to a product of w*P(X), a decrement path for w that is proportional to P(X, Y), and delay and spike timing dependent plasticity (STDP) parameters such that w increases and decreases with the same magnitude for a single firing event.

In another aspect, the spiking neural network comprises a plurality of synapses, wherein all neurons, except for the B neuron, have the same threshold voltage, and wherein the synaptic weight w between the A neuron and the B neuron is the only synapse that has STDP, wherein all other synapses have a fixed weight that is designed to trigger post-synaptic neurons when pre-synaptic neurons fire.

In another aspect, a sign of the STDP is inverted such that if the A neuron spikes before the B neuron, the synaptic weight w is decreased.

In another aspect, the spiking neural network further comprises an XY neuron connected with both the A neuron and the B neuron, and wherein a delay is imposed between the XY neuron and the A neuron, which causes an increase in the synaptic weight w.

In another aspect, wherein when the X neuron fires, the B neuron spikes after the A neuron in proportion to the synaptic weight w, such that a spiking rate for the B neuron depends on a product between a spiking rate of the X neuron and the synaptic weight w.

In another aspect, the spiking neural network implemented by the neuromorphic hardware further comprises a subtractor circuit, and the subtractor circuit is used to compare the random variables X and Y.

Finally, the present invention also includes a computer implemented method. The computer implemented method includes an act of causing a computer to execute instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 9 is a table illustrating probabilities computed by the neural network according to some embodiments of the present disclosure;

DETAILED DESCRIPTION

Figure 1:
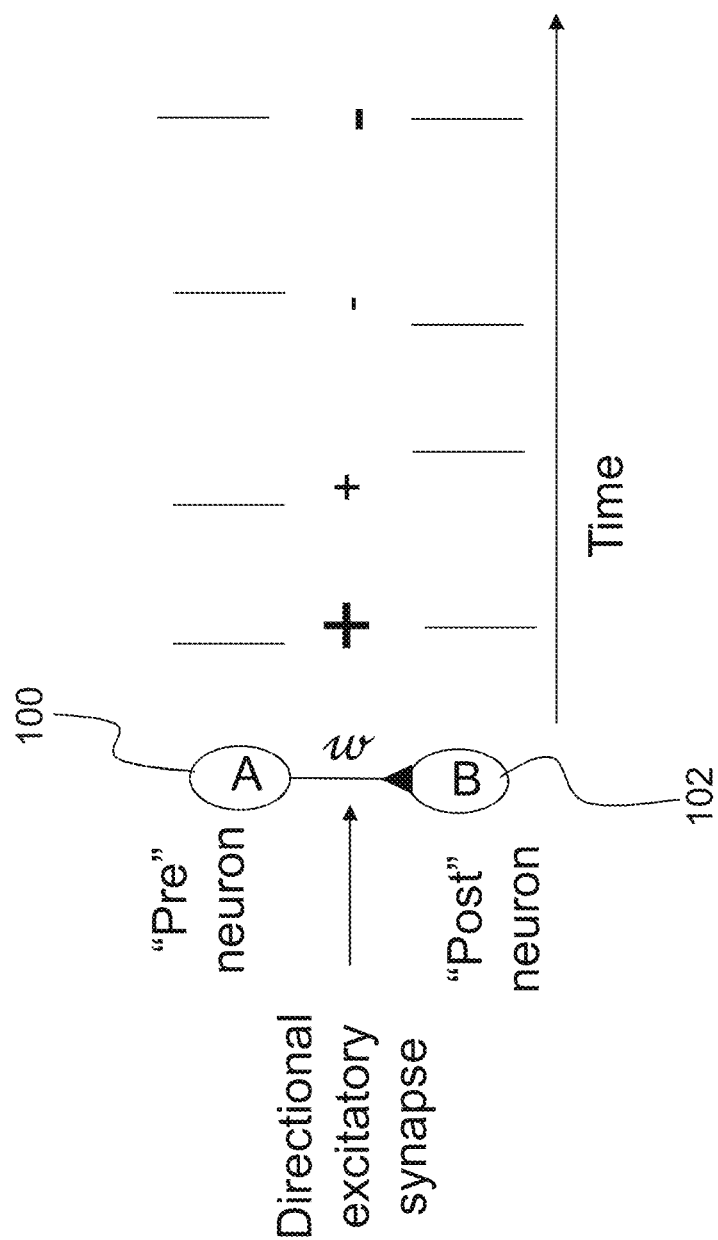
FIG. 1 is an illustration of spike timing dependent plasticity (STDP) according to some embodiments of the present disclosure.

The present invention relates to a system for computing conditional probabilities of random variables for structure learning and Bayesian inference and, more particularly, to a system for computing conditional probabilities of random variables for structure learning and Bayesian inference using a unique spiking neural network. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. J. Bill, L. Buesing, S. Habenschuss, B. Nessler, W. Maass, and R. Legenstein. Distributed Bayesian Computation and Self-Organized Learning in Sheets of Spiking Neurons with Local Lateral Inhibition. PloS one, 10(8):e0134356, 2015.
2. N. Stepp, A. Jammalamadaka. A Dynamical Systems Approach to Neuromorphic Computation of Conditional Probabilities. 1-4. Proceedings of the International Conference on Neuromorphic Systems. ICONS'18, 2018.
3. Ş. Mihalaş, E. Niebur. A Generalized Linear Integrate-and-Fire Neural Model Produces Diverse Spiking Behaviors. Neural Computation, 21(3):704-718, 2009.
4. C. W. J. Granger. Investigating Causal Relations by Econometric Models and Cross-Spectral Methods. Econometrica 37, 424-438, 1969.
5. Song, S., Miller K. D., and L. F. Abbott. Competitive Hebbian Learning through Spike-Timing Dependent Synaptic Plasticity. Nat Neurosci 3(9): 919-926, 2000.

(2) PRINCIPAL ASPECTS

Various embodiments of the invention include three "principal" aspects. The first is a system for computing conditional probabilities of random variables for structure learning and Bayesian inference. The system is typically in the form of a computer system operating software (e.g., neuromorphic hardware) or in the form of a "hard-coded" instruction set. This system may be incorporated into a wide variety of devices that provide different functionalities. Neuromorphic hardware is any electronic device which mimics the natural biological structures of the nervous system. The implementation of neuromorphic computing on the hardware level can be realized by oxide-based memristors, spintronic memories, threshold switches, and transistors. The second principal aspect is a method, typically in the form of software, implemented using the neuromorphic hardware (digital computer).

The digital computer system (neuromorphic hardware) is configured to perform calculations, processes, operations, and/or functions associated with a program or algorithm. In one aspect, certain processes and steps discussed herein are realized as a series of instructions (e.g., software program) that reside within computer readable memory units and are executed by a digital computer. When executed, the instructions cause the digital computer to perform specific actions and exhibit specific behavior, such as described herein.

(3) SPECIFIC DETAILS OF VARIOUS EMBODIMENTS

In machine learning, Bayesian inference is a popular framework for making decisions by estimating the conditional dependencies between different variables in the data. The inference task is often computationally expensive and performed using conventional digital computers. Described herein is a unique spiking neural network to compute the conditional probabilities of random variables for structure learning and Bayesian inference. "Random variables" is a statistical term meaning that their values over time are taken from a kind of random distribution. The X and Y neurons are made to spike along with these random variables. In addition to drastically reducing the number of required neurons in the network by inverting the spike-timing-dependent plasticity (STDP) parameters and improving the accuracy by employing a dynamic threshold, the spiking neural network has a new network topology that enables efficient computation beyond the state-of-the-art methods.

The advantages of using a spiking neural network to calculate conditional probabilities are two-fold: energy-efficiency and parallelism. Spiking neural networks are often more energy-efficient than conventional computers due to the elimination of high frequency clocking operations in digital circuits. Neural computations are event-driven, which means that they consume energy only when necessary or when new information is available. Moreover, neural networks are highly parallel. Data is processed simultaneously through multiple neural pathways. These two characteristics are utilized in the system described herein to devise a power-efficient, massively-parallel machine for tackling the Bayesian inference task, as will be described in further detail below.

FIG. 1 is a depiction of Spike Timing Dependent Plasticity (STDP). STDP results in strengthening connections due to correlated spikes, and weakening connections due to uncorrelated spikes. For example, in FIG. 1, if neuron A (element 100) spikes just before neuron B (element 102), then w increases a lot; if neuron A (element 100) spikes a long time before neuron B (element 102) then w increases a little bit. Similarly, if neuron B (element 102) spikes just before neuron A (element 100) then w decreases a lot, and if neuron B (element 102) spikes a long time before neuron A (element 100), w decreases a little bit.

Neuron B (element 102) has a voltage threshold which, if exceeded, causes it to spike. Spikes from neuron A (element 100) weighted by w accumulate voltage in neuron B (element 102) until this threshold is reached, at which point neuron B (element 102) spikes, w is incremented, and the voltage level is reset to zero. This means that if w=0, ẇ=0, and if w increases ẇ also increases (i.e., there is a monotonic mapping between w and ẇ). Since the likelihood of neuron B (element 102) spiking (and w being incremented) is directly proportional to the value of w, write ẇ=w for the instantaneous change in w at time t. The goal is to use these dynamics to create a conditional probabilistic computation unit, which can then be used to model chains of conditional variables corresponding to larger Bayesian networks.

Figure 2:
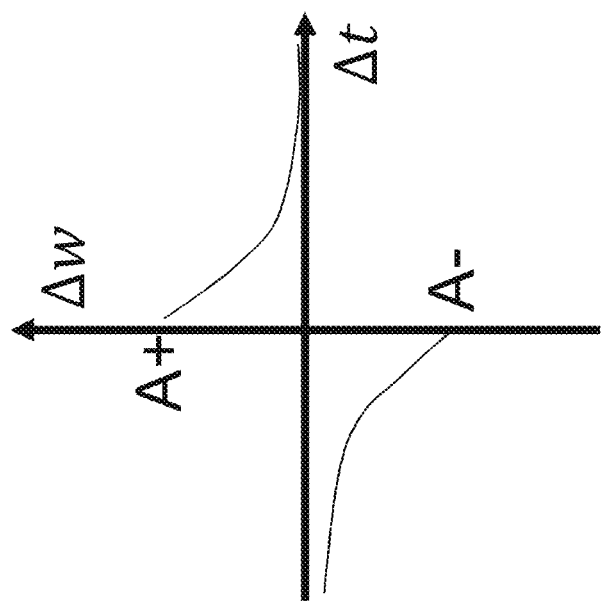
FIG. 2 is an illustration of a relationship between weight change and a spike interval for STDP according to some embodiments of the present disclosure.

FIG. 2 illustrates the relationship between weight change and spike interval for STDP. More specifically, FIG. 2 depicts the relationship between the magnitude of the weight update and the time difference ($\Delta t$) between the pre-synaptic and the post-synaptic spikes. In the implementation according to embodiments of the present disclosure, $A^+$ and $A^-$ determine the speed of convergence to the final weight value (i.e., the learning rate). A higher learning rate will converge faster, but the solution is less accurate. As a non-limiting example, 0.008 was used as the learning rate to achieve a good trade-off between speed and accuracy.

(3.1) Neural Network Topology of the Probabilistic Computation Unit (PCU+)

(3.1.1) Conditional Probability Computation

The neural network topology described herein is capable of computing the conditional probability of two random variables (X and Y). From Bayes' theorem, the conditional probability can be computed as $$P(Y \mid X) = \frac{P(X, Y)}{P(X)} = w \quad (1)$$

which is stored in the synaptic weight w between neuron A (element 100) and neuron B (element 102) after the computation. Rearranging Equation (1), an equation is obtained that describes the desired equilibrium of the neural network as follows:

$$w^*P(X)=P(X,Y) \quad (2)$$

When the left-hand side of Equation (2) equals the right-hand side, w equals the conditional probability, P(Y|X). It is, therefore, the goal to design a neural network that has the following characteristics:

1) An increment path for w that is proportional to the product of w*P(X)
2) A decrement path for w that is proportional to P(X,Y)
3) Correct delay and STDP parameters such that w increases and decreases with the same magnitude for a single firing event.

Figure 3:
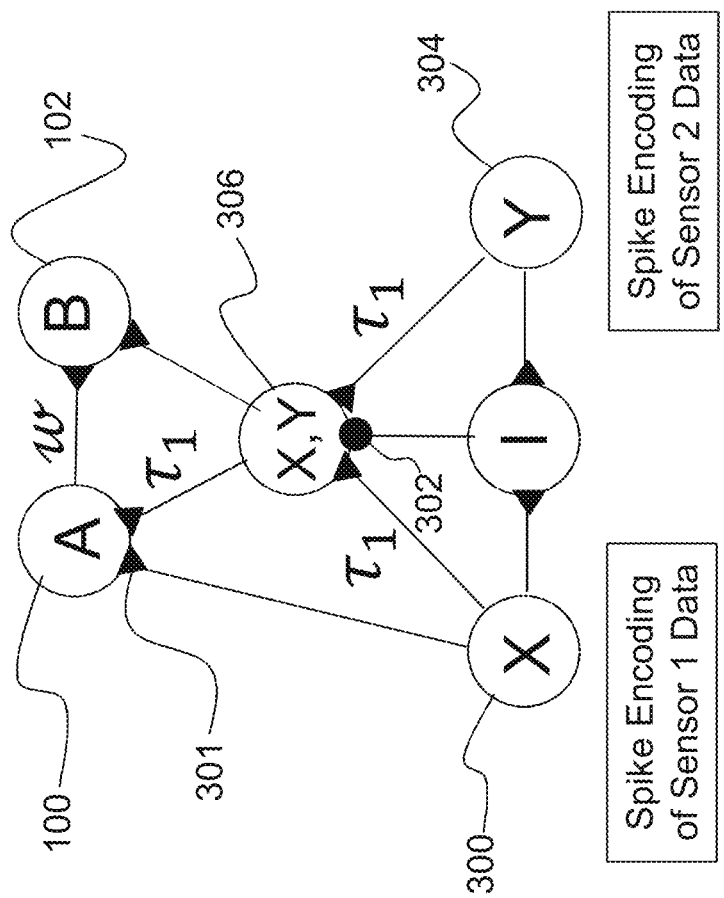
FIG. 3 is an illustration of network topology for a probabilistic computation unit (PCU+) according to some embodiments of the present disclosure.

To realize the functions listed above, the PCU+ architecture shown in FIG. 3 was created. Circular nodes (e.g., X neuron (element 300)) in the network represent neurons, and inhibitory synapses are drawn with a circle (element 302) at the end of the connection, and triangles (element 301) represent excitatory synapses, which are considered the default synapses). All neurons have a threshold voltage of 1 volt except for neuron B (element 102). The only synapse that has STDP is the one between neuron A (element 100) and B (element 102); other synapses have a fixed weight (e.g. 1.0000001) that is designed to trigger the post-synaptic neurons when the pre-synaptic neurons fire. Although the network will work with a wide range of parameters, for illustration purposes only, a symmetric STDP function was used, $\tau_1$ was set to be the unit delay between two neurons (0.1 milliseconds (ms)), and one volt was used as the firing threshold. All of the neurons are of the integrate-and-fire type, which sums up all of the input voltages from pre-synaptic spikes. The decay constant $\tau_{decay}$ for the membrane potential is set to infinity; therefore, each neuron's membrane potential will never decay. The integrate-and-fire dynamics can be implemented using the following equations (see Literature Reference No. 3):

$$\frac{dV_i}{dt} = -\frac{(V_i - V_{reset})}{\tau_{decay}} \quad (3)$$

and $$V_i = V_i + \sum_j w_j * I_j \quad (4)$$

where $V_i$ is the membrane potential in volt for the $i^{th}$ neuron. $I_j$ is an indicator function for identifying which of the pre-synaptic neurons have fired:

$$I_j = \begin{cases} 1, \text{ if the } j^{th} \text{ input neuron fires at the current time step} \\ 0, \text{ otherwise} \end{cases} \quad (5)$$

After updating the membrane potentials for each of the neurons, the membrane potentials are compared with the threshold voltages $V_{threshold}$ to determine if the neuron fires or not. $V_{threshold}$ is set to a constant value (e.g., one volt) except for neuron B (element 102), whose threshold is adjusted dynamically as described later. After the firing event, the membrane potential is reset to $V_{reset}$; $V_{reset}$ is zero for all neurons. The method described herein uses reverse STDP update rules and the topology shown in FIG. 3 for storing the computed conditional probability in the weight value between two neurons.

Figure 12:
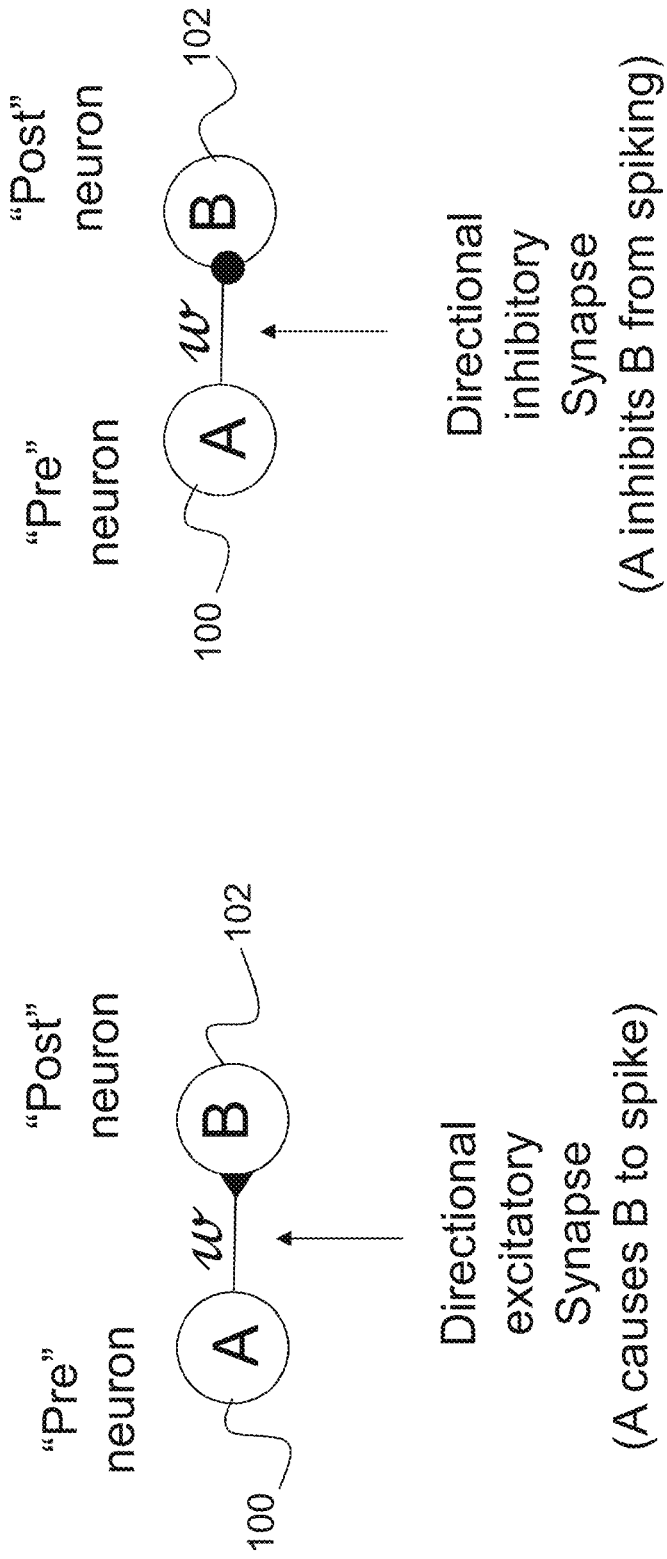
FIG. 12A is an illustration of a directional excitatory synapse according to some embodiments of the present disclosure.
FIG. 12B is an illustration of a directional inhibitory synapse according to some embodiments of the present disclosure.

FIGS. 12A and 12B depict examples of a directional excitatory synapse and a directional inhibitory synapse, respectively. FIG. 12A shows a directional excitatory synapse, where neuron A (element 100) causes neuron B (element 102) to spike. FIG. 12B shows a directional inhibitory synapse, where neuron A (element 100) inhibits neuron B (element 102) from spiking.

(3.1.2) STDP Reversal

Figure 5:
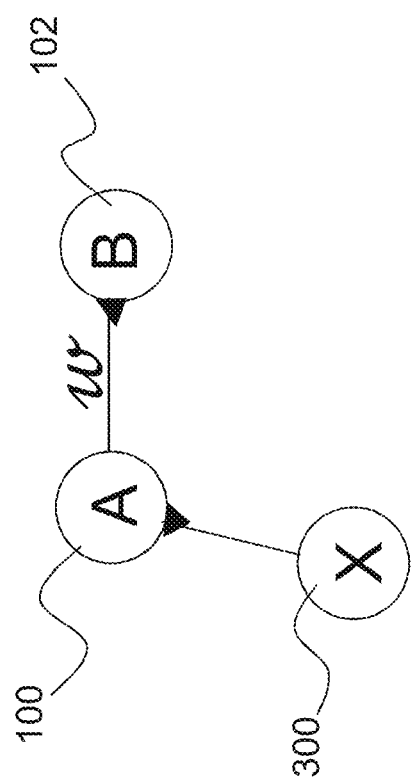
FIG. 5 is an illustration of a neural path for decreasing the synaptic weight according to some embodiments of the present disclosure.

In one embodiment, the sign of STDP was purposely inverted such that if neuron A (element 100) spikes before neuron B (element 102) in FIG. 5, the synaptic weight w is decreased. The reversal of STDP is necessary to decrease w when P(X) increases in order to keep w*P(X) constant. This is important for the network to converge to the desired equilibrium point instead of diverging away from it. The sign of the STDP being inverted results in the function illustrated in FIG. 2 being flipped about the time axis.

(3.1.3) Increment Path for w

Figure 4:
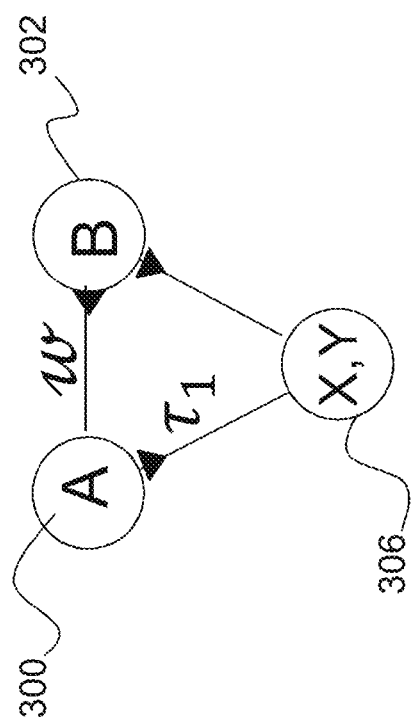
FIG. 4 is an illustration of a neural path for increasing the synaptic weight according to some embodiments of the present disclosure.

FIG. 4 illustrates the neural structure for increasing the synaptic weight w. A delay between the XY neuron (element 400) and neuron A (element 100) is imposed, which causes w to increase when the XY neuron (element 400) fires because the A neuron (element 100) spikes after the B neuron (element 102) and the sign of the STDP is inverted.

(3.1.4) Decrement Path for w

To decrease the weight, w, connect the X neuron (element 300) to neuron A (element 100), as shown in FIG. 5. In this case, when the X neuron (element 300) fires, the B neuron (element 102) spikes after the A neuron (element 100) in proportion to w. The spiking rate for the B neuron (element 102) depends on the product between the spiking rate of the X neuron (element 300) and w. That is, $$\text{speed of } w \text{ decreasing} = P(X)*w. \quad (6)$$

(3.1.5) Dynamic Threshold

In order for Equation (6) to hold true, the firing threshold for neuron B (element 102) needs to be adjusted dynamically according to the sum of the input voltages. This is named the dynamic threshold $V_{dt}$, which only affects neuron B (element 102). More specifically, the threshold is reduced by the same amount as the overshoot of membrane potential from the previous firing event. Equation (7) describes the update rule for $V_{dt}$. $V_{threshold}$ is set to one volt in one embodiment. The dynamic threshold allows the network to calculate the product between w and P(X) more accurately; otherwise, w will suffer from imprecision because it takes the same number of spikes from the A neuron (element 100) to trigger the B neuron (element 102) when w is larger than 0.5. The dynamic threshold is updated each time after neuron B (element 102) fires according to this equation:

$$V_{dt} = V_{threshold} - (V_B - V_{dt}), \quad (7)$$

where $V_{dt}$ is the voltage threshold for the B neuron (element 102). $V_{threshold}$ is the normal voltage threshold, which is set to 1V. $V_B$ is the membrane potential of the B neuron (element 102) after accumulating all of the input voltages at the current time step. Note that in order for Equation (7) to work as designed, it is important to avoid conflicts between the increment path and the decrement path. For this reason, a delay of four units (0.4 ms) is imposed between the X neuron (element 300) and the A neuron (element 100) to allow w to increase first then decrease in the case where both paths are triggered.

(3.1.6) Modes of Operation

The neuron network can be operated in two modes: one is the training phase and the other is the measurement phase. The objective of the training phase is to allow weight w to converge to the targeted P(Y|X). During this phase, spikes from the two random variables are fed to neuron X (element 300) and neuron Y (element 304 in FIGS. 3 and 6). STDP is enabled for the synapse between neuron A (element 100) and neuron B (element 102). After the training phase is complete (after a certain amount of time defined by the users that suit their speed and accuracy requirements), the network enters the measurement phase. The goal of the measurement phase is to determine the dependency between the two random variables by calculating |P(Y)−P(Y|X)|. P(X) is set to one in the measurement phase (i.e., it spikes continuously). STDP is disabled to prevent w from being altered. The resulting calculation (the deviation of the conditional probability from the intrinsic value) is encoded in the firing rate of the neuron F (element 600) in FIG. 6. The conditional probability P(Y|X) is recorded by reading out the synaptic weight w.

(3.1.7) Subtractor Circuit

Figure 6:
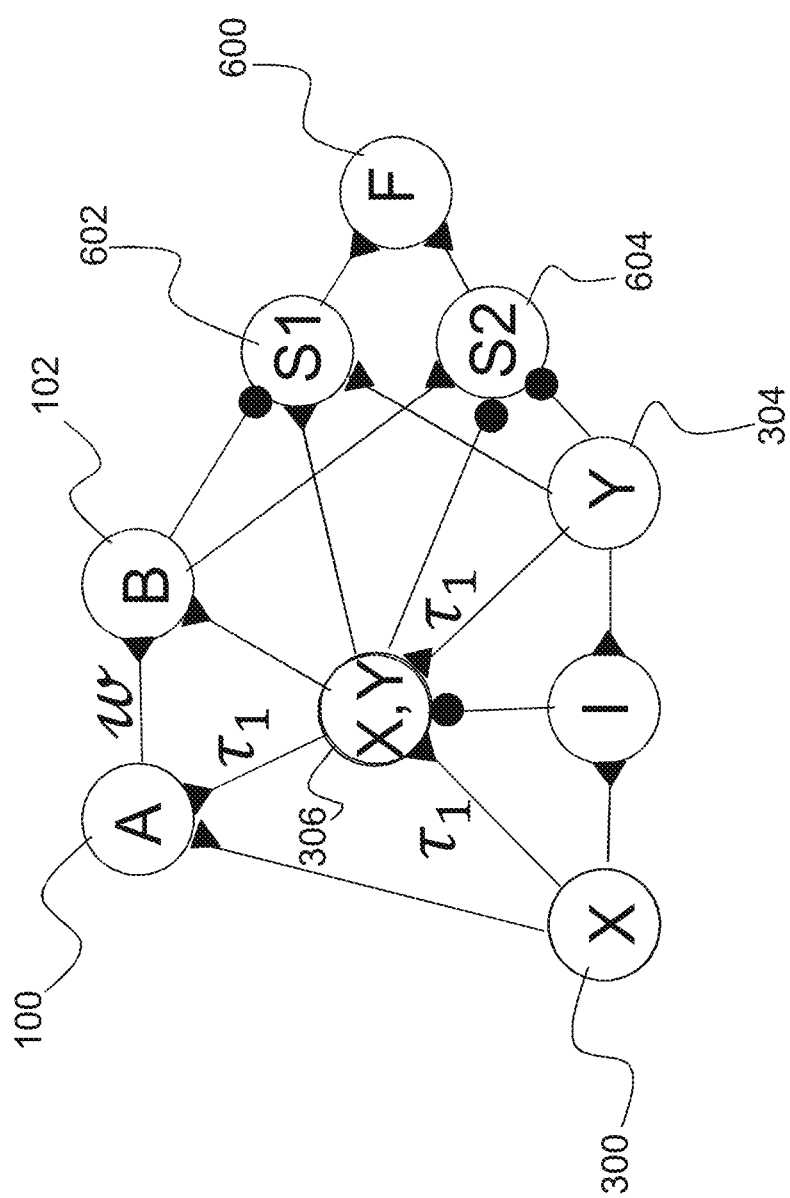
FIG. 6 is an illustration of a PCU+ with the subtractor circuit according to some embodiments of the present disclosure.

FIG. 6 shows a neural network with a subtractor circuit (S1, S2, F) for calculating the absolute difference between P(Y) and P(Y|X). The firing rate of neuron F (element 600) measures the likelihood that neuron X (element 300) causes neuron Y (element 304) to happen. The S1 neuron (element 602) takes three inputs (from neuron B (element 102), XY (element 306), and Y (element 304)). During the measurement phase of the operation, P(X) is set to one. The synapse between the B neuron (element 102) and the S1 neuron (element 602) is inhibitory, meaning that the membrane potential is reduced if the B neuron (element 102) fires. On the other hand, the synapse between the Y neuron (element 304) and the S1 neuron (element 602) is excitatory. As a result, the firing rate of the S1 neuron (element 602) computes P(Y)−P(Y|X). The synapse between the XY neuron (element 306) and the S1 neuron (element 602) is to compensate for the undesired artifact that the B neuron (element 102) will fire when the XY neuron (element 306) is triggered during the measurement phase, improving the accuracy of the subtraction calculation. The S2 neuron (element 604) works similarly; however, it computes P(Y|X)−P(Y) instead. Neuron F (element 600) outputs the sum of the two firing rates. P(Y)−P(Y|X) and P(Y|X)−P(Y) are exactly opposite in sign, and because firing probabilities are non-negative, any negative values are reset to zero. Equations (9) through (11) below demonstrate how neuron F (element 600) effectively implements the following absolute function:

$$\text{Likelihood}\{X \rightarrow Y\} = |P(Y) - P(Y|X)| = \text{firing rate of } F * \text{resolution} \quad (8)$$

where the firing rate of F is measured in Hertz (Hz), and resolution is measured in seconds. Resolution is the time interval between two data points in the input data stream. Likelihood{X→Y} is a unit-less number between 0 and 1, which is compared with a threshold to determine the dependency between X and Y.

The S1 (element 602), the S2 (element 604), and the F (element 600) neurons are also integrate-and-fire type neurons with the same equations as described in Equations (3) through (5). All of their thresholds are set to one volt, and all the connection weights are set to 1.0000001. In addition, the S1 (element 602) and S2 (element 604) neurons have a lower and upper membrane potential limits to prevent the voltages from running away uncontrollably; the voltage limits are set to [−5,5] volts in one embodiment. The probability of firing for neuron S1 (element 602), S2 (element 604), and F (element 600) can be described using the following equations:

$$P(S1) = \max(-[P(Y|X) + P(X,Y)] + P(X,Y) + P(Y), 0) = \max(P(Y) - P(Y|X), 0) \quad (9)$$

$$P(S2) = \max([P(Y|X) + P(X,Y)] - P(X,Y) - P(Y), 0) = \max(P(Y|X) - P(Y), 0) \quad (10)$$

$$P(F) = P(S1) + P(S2) = \max(P(Y) - P(Y|X), 0) + \max(P(Y|X) - P(Y), 0) = |P(Y) - P(Y|X)| \quad (11)$$

where P(S1), P(S2), and P(F) are unit-less numbers between zero and one that represent the probabilities of firing at any given time step. The max(·,0) operators in equations (9) through (11) are used to account for the fact that probabilities cannot be negative.

In summary, FIG. 6 depicts a neuronal network topology for computing the conditional dependency structure between two or more random variables encoded as input data streams. The topology uses a subtractor circuit to compare P(X) to P(Y|X) and determine pairwise conditional structure for a network of random variables. In addition, described herein is a method for learning conditional structure by determining independence and conditional dependence of temporally lagged variables using the network topology shown in FIG. 6.

(3.1.8) Spiking Encoder/Decoder

Figure 10B:
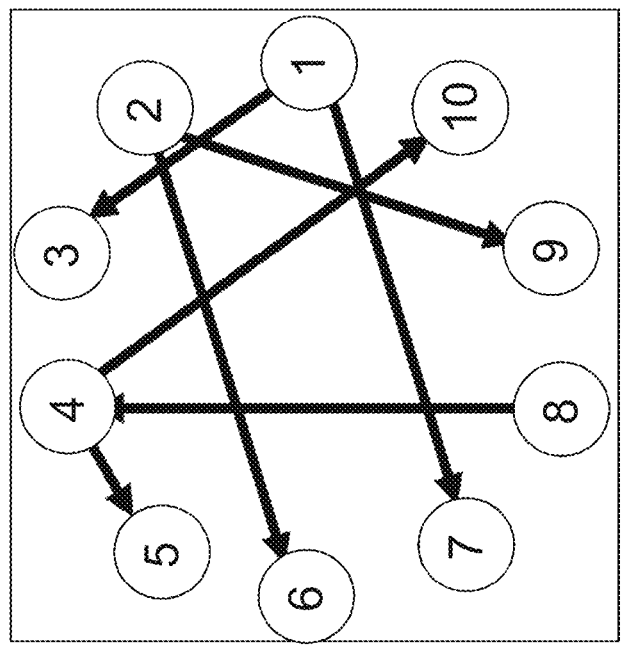
FIG. 10B is an illustration of ground truth dependencies according to some embodiments of the present disclosure.
Figure 10A:
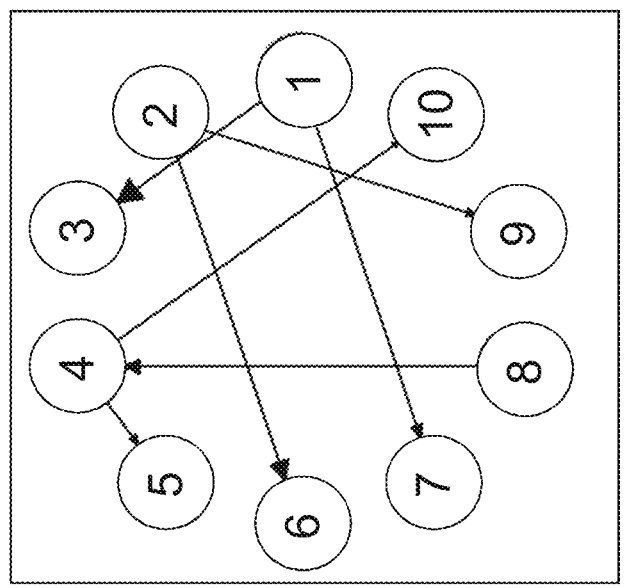
FIG. 10A is an illustration of dependencies found by the PCU+ for ten random variables according to some embodiments of the present disclosure.
Figure 11:
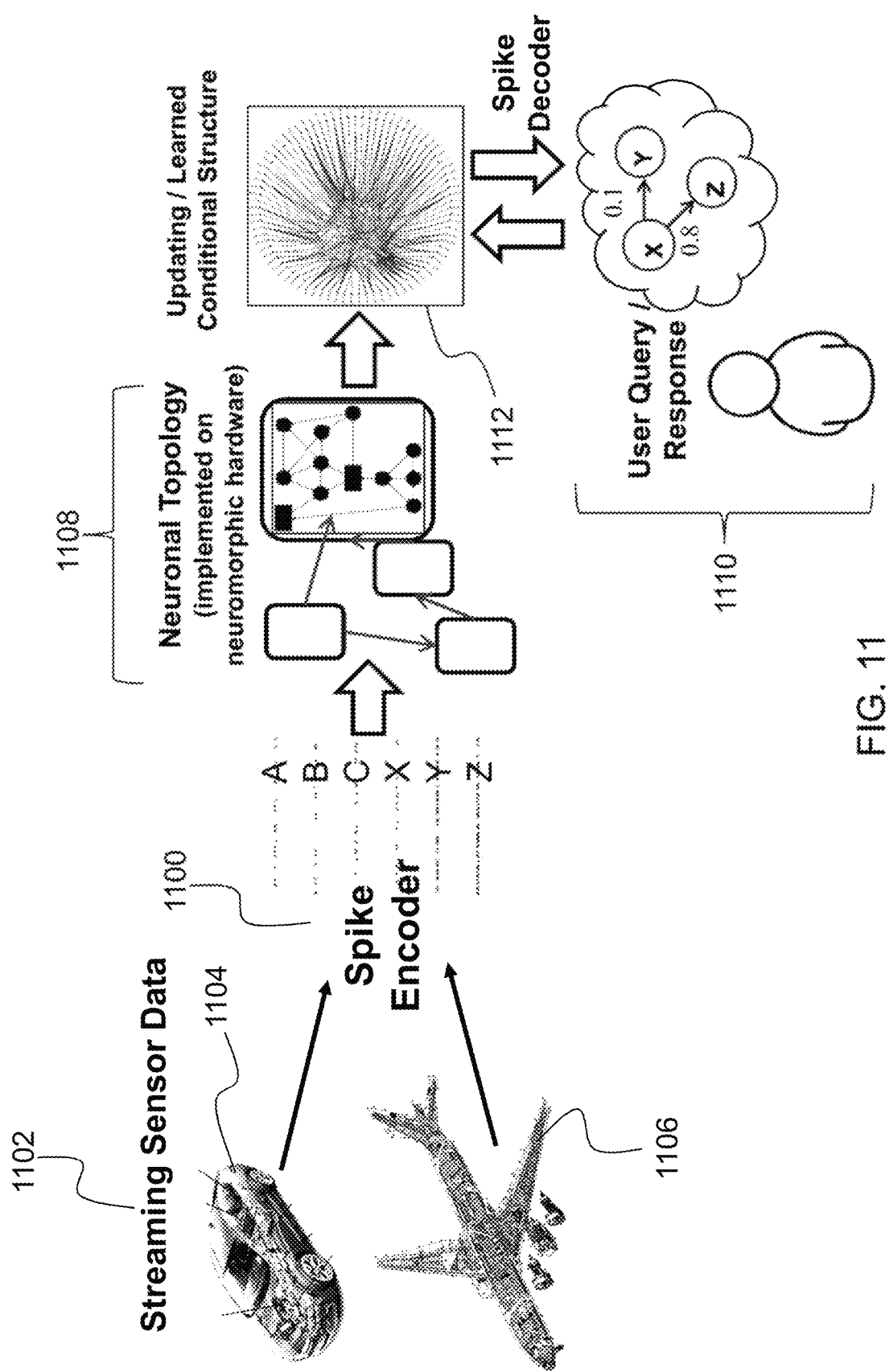
FIG. 11 is an illustration of the system flow of the system for computing conditional probabilities of random variables for structure learning and Bayesian inference according to some embodiments of the present disclosure.

FIG. 11 depicts the system flow for the system for computing conditional probabilities of random variables for structure learning and Bayesian inference according to embodiments of the present disclosure. The spike encoder takes input sensor data and rate codes the values into frequencies of spikes in input spike trains, while the spiking decoder takes the output spike trains and decodes the frequencies of spikes back into values for the random variables and/or conditional probabilities, depending on what the user has queried. The inputs X (element 300) and Y (element 304) shown in FIG. 3 come from the spike encoding (element 1100) of streaming sensor data (element 1102) on a mobile platform, such as a ground vehicle (element 1104) or aircraft (element 1106), as depicted in FIG. 11. The values of the streaming sensor data (element 1102) will be temporally coded using rate coding. Probabilistic input spikes for X (element 300) are generated as fixed-rate Poisson process. Each time there is a spike in the realization of X (element 300), Y (element 304) spikes are generated with a fixed Bernoulli probability P. To generate the results shown in FIGS. 9, 10A, and 10B, ten Bernoulli random variables were generated using this method, some of which are conditionally dependent on each other.

(3.1.9) Neuronal Topology (FIG. 11, Element 1108)

Figure 13:
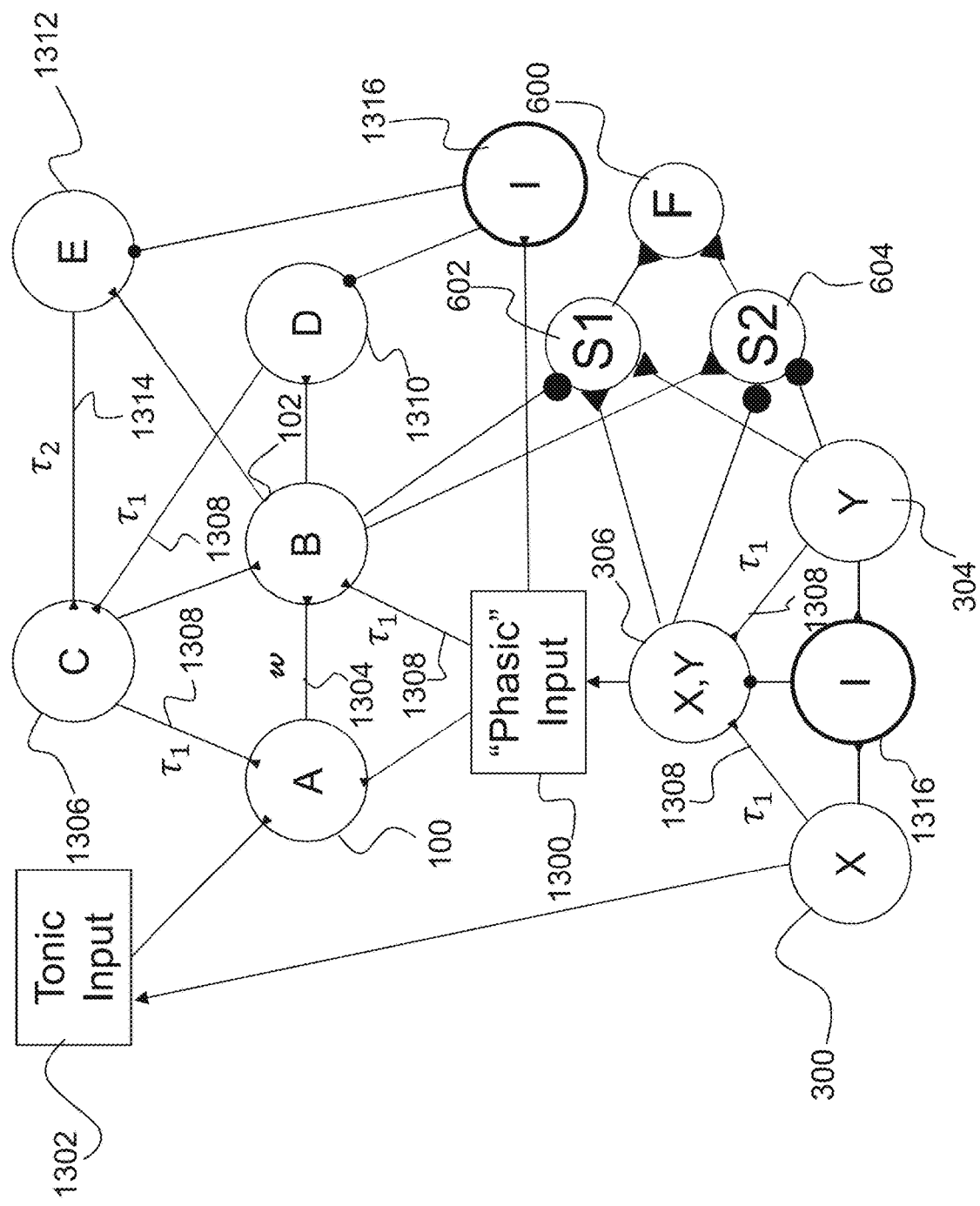
FIG. 13 is an illustration of a full conditional probability unit according to some embodiments of the present disclosure.

The neuromorphic hardware required for implementing the neuronal network topology (element 1108) in FIG. 11 must have specific neuron voltage (spiking) equations, synaptic weight update rules (known as STDP), and specific neuronal voltage dynamics. The STDP required for the PCU+ topology in FIG. 13 is described in Literature Reference No. 5. As a function of $\Delta t = t_{post} - t_{pre}$, $$\Delta w = f(\Delta t) = \begin{cases} A^+ \exp\dfrac{\Delta t}{\tau^+}, & \Delta t \geq 0 \\ -A^- \exp\dfrac{-\Delta t}{\tau^-}, & \Delta t < 0 \end{cases}$$

where $A^+$ and $A^-$ are the maximum and minimum gains, and $\tau^+$ and $\tau^-$ are timescales for weight increase and decrease (FIG. 2). For the topologies in FIGS. 3 and 6, a unique "STDP Reversal" update rule is employed, such that the conditions for the two cases (i.e., $\Delta t \geq 0$, $\Delta t < 0$) are swapped. This reversal may not be implementable on existing general-purpose neuromorphic hardware. The voltage update rules required for the system described herein are described in Equations (3), (4), (5), and (7). Additional details regarding the neuronal topology (element 1108) implemented on neuromorphic hardware can be found in U.S. application Ser. No. 16/294,815, entitled "A Neuronal Network Topology for Computing Conditional Probabilities," which is hereby incorporated by reference as though fully set forth herein. The neuromorphic computing hardware according to embodiments of the present disclosure replaces the usage of a digital computer CPU (control processing unit) or GPU (graphics processing unit).

(3.1.10) Neuromorphic Compiler (FIG. 11, Element 1110)

The neuromorphic compiler (element 1110) is detailed in U.S. application Ser. No. 16/294,886, entitled, "Programming Model for a Bayesian Neuromorphic Compiler," which is hereby incorporated by reference as though fully set forth herein. It is a programming model which lets users query Bayesian network probabilities from the learned conditional model (element 1112) for further processing or decision making. The learned conditional model (element 1112) refers to the conditional properties learned between input random variables. For example, if the probability of Y=5 given that X=3 is 60%, then P(Y|X)=0.6 is part of the learned conditional model (element 1112). For instance, in a fault message application this can be preventative repair of expected future faults based on current faults. Preventative repair is when parts on a machine (e.g., vehicle) are replaced before they actually wear out, so that they don't end up wearing out while in operation. For example, if a user sees a system fault message #1 while a vehicle is in operation, and the user knows that P(system fault message #2|system fault message #1)=95%, the user can preventatively replace the vehicle part corresponding to system fault message #2 in anticipation that it will fail soon as well.

FIG. 13 is an illustration of a full conditional probability unit according to some embodiments of the present disclosure. In order to compute the conditional probability of two input processes X (element 300) and Y (element 304), define inputs to $I_P$ (i.e., phasic input (element 1300)) and $I_T$ (i.e., tonic input (element 1302)), as shown in FIG. 13. $I_P$ (element 1300) comes from the logical AND of the two input processes X (element 300) and Y (element 304), and $I_T$ (element 1302) comes straight from X (element 300). Since the Tonic input (element 1302) corresponds to P(X) and the Phasic input (element 1300) corresponds to P(X,Y), this equation forces w (element 1304) to converge to P(X,Y)|P(X)=P(Y|X). The "Tonic" input $I_T$ (element 1302) causes A (element 100) to spike, A (element 100) causes B (element 102) to spike, resulting in an increase to w (element 1304). However, if C (element 1306) spikes, delay $\tau_1$ (element 1308) will cause B (element 102) to spike before A (element 100), causing w (element 1304) to decrease. Additionally, A (element 100) will not cause B (element 102) to spike after $\tau_1$ (element 1308) due to B's (element 102) refractory period, which is the period after stimulation where a neuron is unresponsive. The refractory period of a neuron is a period just after the spikes during which it cannot spike again, even if it receives input spikes from neighboring neurons. This is a known biological mechanism leveraged by the network according to embodiments of the present disclosure. This results in maintenance of a balance, dependent on C (element 1306) (i.e., if C (element 1306) spikes every time B (element 102) spikes then the a increment from A (element 100) will cancel with that of C (element 1306), producing $\dot{w}=0$).

Furthermore, two more neurons D (element 1310) and E (element 1312) were added, with input from B (element 102) and delays $\tau_1$ (element 1308) and $\tau_2$ (element 1314), respectively. Since $\tau_1$ (element 1308)<$\tau_2$ (element 1314), B (element 102) will cause C (element 1306) to spike twice: once through D (element 1310) (fast path) and once through E (element 1312) (slow path). Since the delay $\tau_1$ is less than $\tau_2$, the spikes that travel from B→E→C will take longer than the spikes that travel from B→D→C, which explains the designation between "fast path" and "slow path". Thus, for each spike from the tonic input $I_T$ (element 1302) that causes w (element 1304) to increase, there are two spikes coming from C (element 1306) that cause it to decrease. As a result, w (element 1304) decreases in proportion to itself (i.e., $\dot{w}=wI_T-2wI_T=-wI_T$). An additional neuron I (element 1316) inhibits neurons D (element 1310) and E (element 1312) so that they will not spike with $I_P$ (element 1300), and there will be no associated decrease in w (element 1304). Note that if B (element 102) spikes as a result of $I_P$ (element 1300) it will not spike again due to $I_T$ (element 1302) because of B's (element 102) refractory period. This network now models the fixed point: $\dot{w}=-wI_T+I_P$.

(3.2) Experimental Studies

Figure 7:
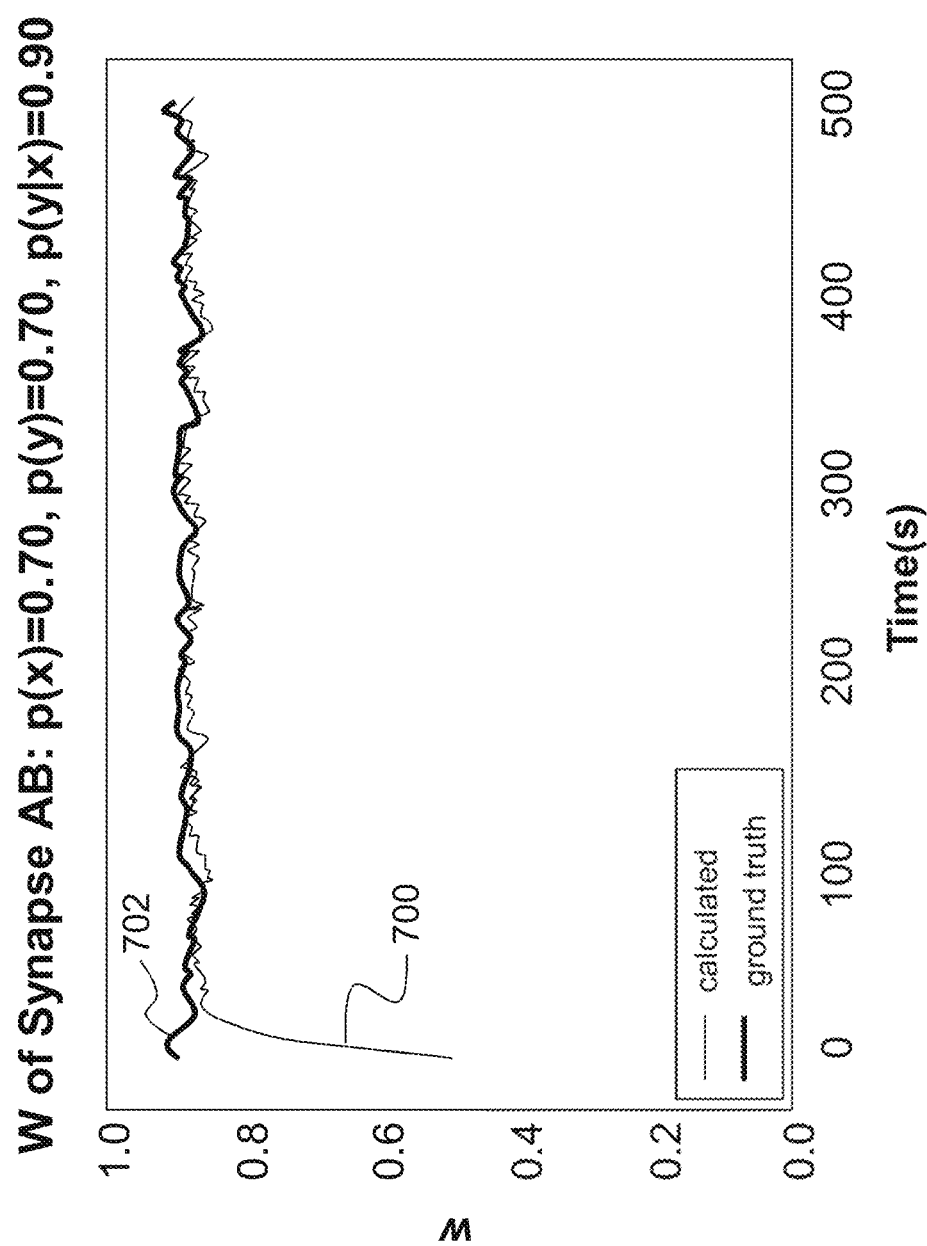
FIG. 7 is a plot illustrating a conditional probability computed by the PCU+ according to some embodiments of the present disclosure.

PCU+ is able to compute the conditional probability of two random variables, as shown in FIG. 7, where the unbolded line (element 700) represents the calculated results, and the bold line (element 702) represents the ground truth. As depicted in FIG. 7, the synaptic weight (w) between A and B converges to the final value in about 30 seconds of neural computation. The time interval between each input data point is 40 ms, and the spiking probability for the inputs are set to 0.7. This means that the PCU+ converged after observing around 500 input spikes; this is a fairly efficient method to estimate the conditional probability. The results also show that w is able to track the fluctuation in P(Y|X) as the system progresses in time. In practice, the weight w is recorded in a variable in a software program or a register in neuromorphic hardware. Most spiking neural network simulators allow recordings of internal variables such as the synaptic weights. On the other hand, in neuromorphic hardware, a register read operation is performed to record the final weight value to a recording media.

Figure 8:
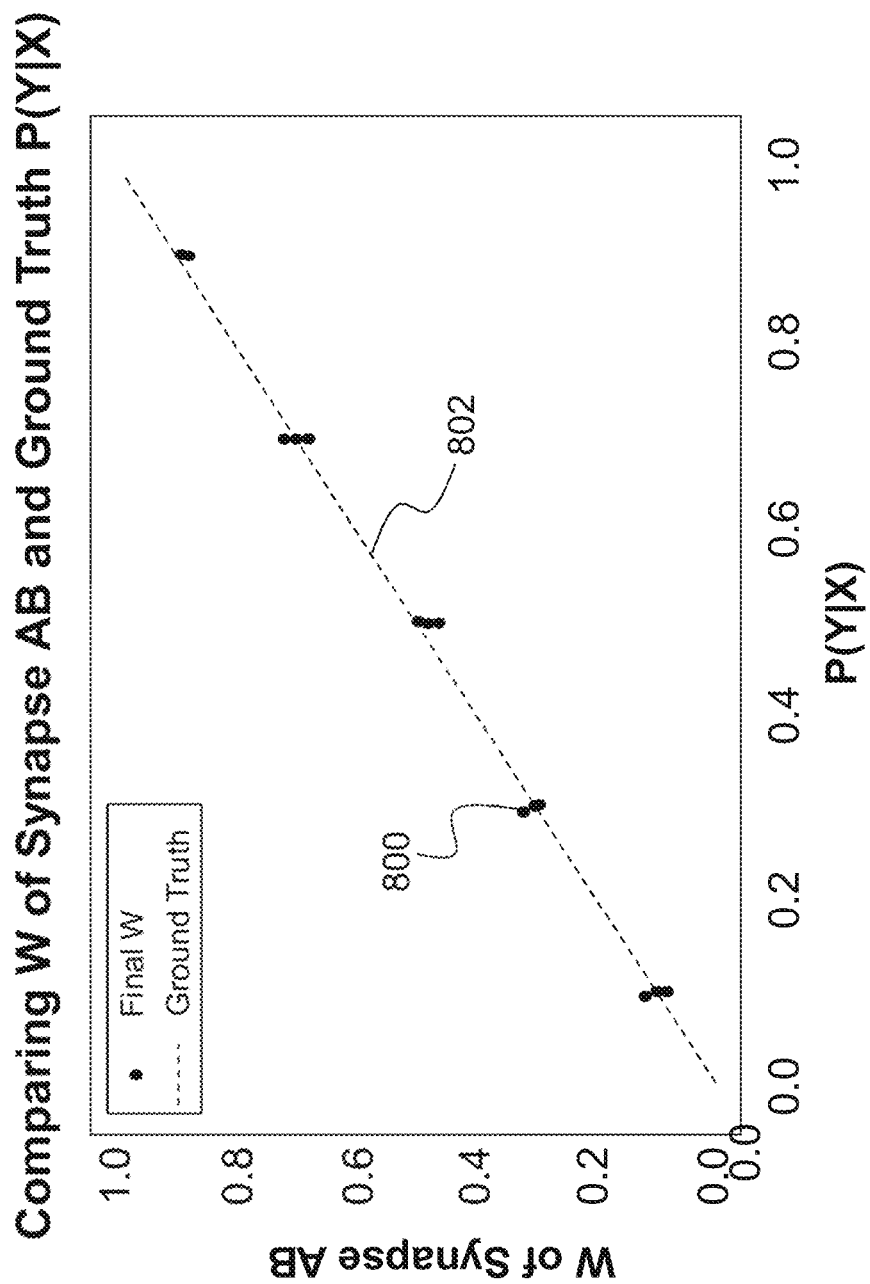
FIG. 8 is a plot illustrating conditional probabilities computed by the PCU+ with different probability settings according to some embodiments of the present disclosure.

FIG. 8 shows the results from a suite of simulations with the PCU+. The probabilities P(X) and P(Y|X) are varied to validate the accuracy of the neural network across different input conditions. The final synaptic weight, w, which encodes P(Y|X), was plotted after each simulation. It was observed that the final weights (represented by filled circles (element 800) align with the ground truth values (i.e., the dotted line (element 802)). Note that the PCU+ circuit is able to accurately compute the conditional probability over the entire range ([0,1]) of possible values.

In addition, the PCU+ with Subtractor Circuit according to embodiments of the present disclosure was applied to solve structure learning problems. In structure learning, the goal is to identify the causal relationships in a Bayesian network. More precisely, in experimental studies, the goal was to find the dependencies between ten different random variables, in which the current value of a variable affects the future values of other variables (i.e., Granger causality (see Literature References No. 4). In order to test for Granger causality, the following pre-processing techniques were performed on the data before being fed to the PCU+. The data for each random variable is a stream of 0s and 1s, recording the occurrence of errors as a time series. Before a pair of data streams (e.g., X and Y) are fed to the PCU+, the data for Y is first shifted earlier by one time step. Effectively, $P(Y_{t+1}|X_t)$ is being calculated instead of $P(Y_t|X_t)$. This is necessary because the cause and the effect happens sequentially in time; by shifting Y forward in the training dataset, whether the current X (i.e., $X_t$) has an effect on future Y (i.e. $Y_{t+1}$) was tested. The dependencies were identified by computing $P(Y_{t+1}|X_t)$ between all pairs of random variables in the system and calculating the deviation of the conditional probabilities, $P(Y_{t+1}|X_t)$, from their intrinsic values, $P(Y_{t+1})$. The deviation, $|P(Y_{t+1})-P(Y_{t+1}|X_t)|$, is encoded in the firing rate of neuron F in each PCU+. A threshold is defined, in which the link is flagged as significant, and a conclusion is made that X causes Y to happen.

One hundred PCU+ were used to compute the conditional probabilities between all combinations of the ten random variables. The table in FIG. 9 summarizes the firing rates of neuron F (element 600) from each PCU+, which encodes $|P(Y_{t+1})-P(Y_{t+1}|X_t)|$. In one embodiment, values larger than 0.055, the threshold indicating a causal relationship, are flagged. The results from the table in FIG. 9 are displayed visually by drawing an arrow between two random variables which have a potential causal relationship, as illustrated in FIG. 10A. The neural network described herein can identify these dependencies with 100% accuracy, as determined by comparison with the ground truth dependencies shown in FIG. 10B.

Bayesian inference is ubiquitous in data science and decision theory. The invention described herein can be used to reduce the operational cost for aircrafts and vehicles through preventive maintenance and diagnostics, enable maneuvering (i.e., driving) of an autonomous vehicle through performing a Bayesian inference task, enhance real-time mission planning for unmanned aircrafts, and facilitate unsupervised structure learning in new environments. Bayesian decision theory is a statistical approach to the problem of pattern classification. Pattern classification, an example of a Bayesian inference task, has several applications, including object detection and object classification. Additionally, an application of the invention described herein is estimating conditional probabilities between fault messages of a ground vehicle or aircraft for fault prognostic models.

In the application of a self-driving vehicle, one or more processors of the system described herein can control one or more motor vehicle components (electrical, non-electrical, mechanical), such as a brake, a steering mechanism, suspension, or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object detection (i.e., a Bayesian inference task) and recognition, the system can cause the autonomous vehicle to perform a driving operation/maneuver (such as steering or another command) in line with driving parameters in accordance with the recognized object. For example, if the system recognizes a bicyclist, another vehicle, or a pedestrian, the system described herein can cause a vehicle maneuver/operation to be performed to avoid a collision with the bicyclist or vehicle (or any other object that should be avoided while driving). The system can cause the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented.

The system according to embodiments of the present disclosure also provides an additional functionality of measuring the deviation from the normal probability, which can be used to indicate potential causality in a Bayesian network. With dynamic threshold, the new network fixes a key problem in the prior art, which is that the computation becomes inaccurate when the conditional probability exceeds a threshold.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for computing conditional probabilities of random variables for Bayesian inference, the system comprising:
neuromorphic hardware configured to implement a spiking neural network, the spiking neural network comprising a plurality of neurons to compute the conditional probability of two random variables X and Y according to the following:

$$w*P(X)=P(X,Y),$$

where P denotes probability, and w denotes a synaptic weight between an A neuron and a connected B neuron;
wherein an X neuron and a Y neuron are configured to spike along with the random variables X and Y;
wherein the spiking neural network comprises an increment path for w that is proportional to a product of w*P(X), a decrement path for w that is proportional to P(X, Y), and delay and spike timing dependent plasticity (STDP) parameters such that w increases and decreases with the same magnitude for a single firing event; and
wherein the neuromorphic hardware controls one or more motor vehicle components based on the computed conditional probability of the random variables X and Y.

2. The system as set forth in claim 1, wherein the spiking neural network implemented by the neuromorphic hardware comprises a plurality of synapses, wherein all neurons, except for the B neuron, have the same threshold voltage, and wherein the synaptic weight w between the A neuron and the B neuron is the only synapse that has STDP, wherein all other synapses have a fixed weight that is designed to trigger post-synaptic neurons when pre-synaptic neurons fire.

3. The system as set forth in claim 2, wherein a sign of the STDP is inverted such that if the A neuron spikes before the B neuron, the synaptic weight w is decreased.

4. The system as set forth in claim 3, wherein the spiking neural network implemented by the neuromorphic hardware further comprises an XY neuron connected with both the A neuron and the B neuron, and wherein a delay is imposed between the XY neuron and the A neuron, which causes an increase in the synaptic weight w.

5. The system as set forth in claim 4, wherein the X neuron is connected with the A neuron, wherein when the X neuron fires, the B neuron spikes after the A neuron in proportion to the synaptic weight w, such that a spiking rate for the B neuron depends on a product between a spiking rate of the X neuron and the synaptic weight w.

6. A neuromorphic hardware implemented method for computing conditional probabilities of random variables for Bayesian inference, the method comprising an act of:
operating a spiking neural network comprising a plurality of neurons to compute the conditional probability of two random variables X and Y according to the following:

$$w*P(X)=P(X,Y),$$

where P denotes probability, and w denotes a synaptic weight between an A neuron and a connected B neuron;
wherein an X neuron and a Y neuron are configured to spike along with the random variables X and Y;
wherein the spiking neural network comprises an increment path for w that is proportional to a product of w*P(X), a decrement path for w that is proportional to P(X, Y), and delay and spike timing dependent plasticity (STDP) parameters such that w increases and decreases with the same magnitude for a single firing event; and
wherein the neuromorphic hardware controls one or more motor vehicle components based on the computed conditional probability of the random variables X and Y.

7. The method as set forth in claim 6, wherein the spiking neural network comprises a plurality of synapses, wherein all neurons, except for the B neuron, have the same threshold voltage, and wherein the synaptic weight w between the A neuron and the B neuron is the only synapse that has STDP, wherein all other synapses have a fixed weight that is designed to trigger post-synaptic neurons when pre-synaptic neurons fire.

8. The method as set forth in claim 7, wherein a sign of the STDP is inverted such that if the A neuron spikes before the B neuron, the synaptic weight w is decreased.

9. The method as set forth in claim 8, wherein the spiking neural network further comprises an XY neuron connected with both the A neuron and the B neuron, and wherein the method further comprises an act of imposing a delay between the XY neuron and the A neuron, which causes an increase in the synaptic weight w.

10. The method as set forth in claim 9, wherein the X neuron is connected with the A neuron, wherein when the X neuron fires, the B neuron spikes after the A neuron in proportion to the synaptic weight w, such that a spiking rate for the B neuron depends on a product between a spiking rate of the X neuron and the synaptic weight w.

11. The system as set forth in claim 1, wherein the spiking neural network implemented by the neuromorphic hardware further comprises a subtractor circuit, and wherein the subtractor circuit is used to compare the random variables X and Y.

12. The method as set forth in claim 6, wherein the spiking neural network further comprises a subtractor circuit, and wherein the method further comprises an act of using the subtractor circuit to compare the random variables X and Y.

* * * * *